United States Patent Office 3,205,812
Patented Sept. 14, 1965

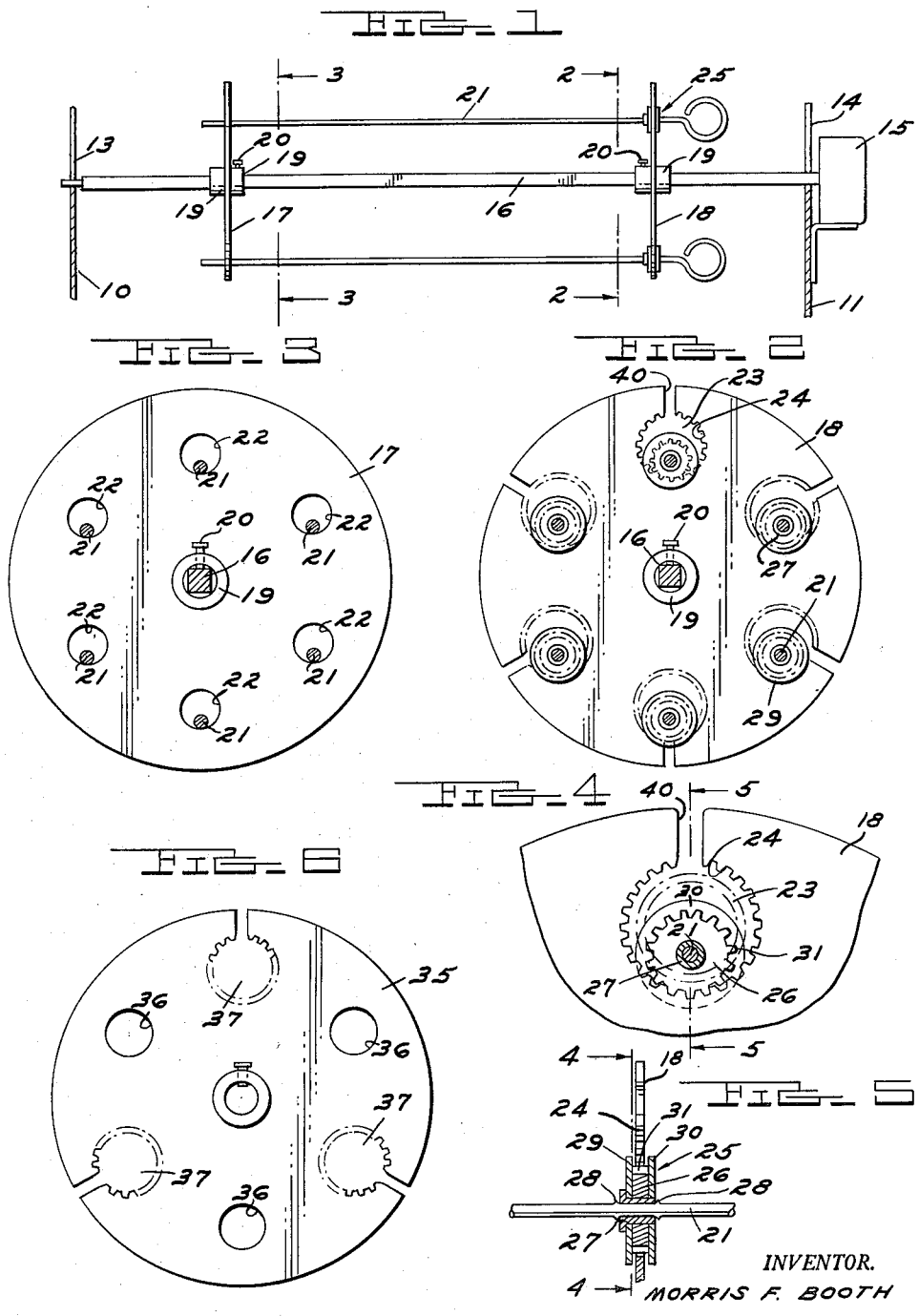

3,205,812
SKEWER COOKING
Morris F. Booth, P.O. Box 63, Alden, Mich.
Filed Feb. 13, 1961, Ser. No. 88,698
4 Claims. (Cl. 99—421)

This invention relates to skewer cooking and particularly to skewer cooking apparatus adapted for use around the home.

In recent years, it has become very popular to barbecue at home, either outdoors in the backyard or in a patio area. For such cooking, various types of outdoor grills have been heretofore provided. In the more deluxe versions, such grills include motor-driven skewers. Where a plurality of skewers are provided, they are mounted on supports and the supports are revolved about an axis bringing the food on the skewers successively adjacent the fire on the grill. One of the problems inherent in such apparatus is that the same surface of the food is brought into adjacent relationship to the fire at all times. In order to change the relation of the food with respect to the fire, a very complex and costly apparatus has been heretofore provided making such apparatus prohibitive for home use.

It is an object of the invention to provide a novel skewer cooking apparatus wherein a plurality of skewers are simultaneously revolved and rotated so that they are brought adjacent a fire in such a manner that different surfaces of the food on the skewers are brought adjacent the fire.

It is a further object of the invention to provide such a skewer apparatus which utilizes a minimum number of parts and can be manufactured at low cost.

It is a further object of the invention to provide an apparatus which can be adapted to conventional motor driven spits now in use with outdoor and patio grills, rotisserie units of gas and electric ranges and portable rotisserie units.

It is a further object of the invention to provide such an apparatus which utilizes gravity to assist in obtaining the desired movement of the skewers.

It is a further object of the invention to provide such an apparatus which can be sold as an accessory in compact form and can be readily assembled and disassembled as desired.

Basically, the apparatus comprises a shaft that is adapted to be rotatably supported on the conventional bearing supports used in connection with motor driven outdoor grills and which is adapted to be operatively driven by the conventional motor on such grills. A pair of supports are provided at longitudinally spaced points on the shaft and one of the supports is formed with a plurality of circumferentially spaced openings into which one end of the skewers extend. The other of the supports is provided with a plurality of circumferentially spaced openings of larger diameter and is formed with teeth around the periphery of each of said openings. A gear on each of the skewers engages the teeth on the last mentioned openings so that when the shaft and the supports are rotated, the skewers are caused to revolve about the axis of the shaft and are simultaneously rotated due to gravity, causing the gears to track about the teeth on the larger openings of the supports. The number of teeth on each gear is preferably less than the number of teeth on each of the openings which it engages, so that successive portions of the food on the skewers are brought adjacent the fire as the skewers are simultaneously revolved and rotated. The various elements of the apparatus are removably interconnected so that the apparatus can be readily assembled and disassembled.

In the drawings:
FIG. 1 is a fragmentary side elevation of the apparatus embodying the invention shown in position on a conventional outdoor grill.
FIG. 2 is a sectional view taken along the line 2—2 in FIG. 1.
FIG. 3 is a sectional view taken along the line 3—3 in FIG. 1.
FIG. 4 is a fragmentary view on an enlarged scale of a portion of the apparatus shown in FIG. 2.
FIG. 5 is a fragmentary sectional view taken along the line 5—5 in FIG. 4.
FIG. 6 is a front elevation of a modified form of plate used in the apparatus.

Referring to FIG. 1, the apparatus embodying the invention is adapted to be used in connection with the conventional skewer bearing supports 10, 11 on an outdoor grill or the like. Such supports comprise vertically extending plates having slots 13, 14 which are adapted to receive a shaft that is driven by an electric motor 15.

The apparatus embodying the invention includes a square shaft 16 that is supported by the bearing members 10, 11 and is adapted to be driven by the electric motor 15. A pair of circular support plates 17, 18 are provided at longitudinally spaced points on the shaft 16. The plates 17, 18 are held in fixed position by collars 19 that clamp the plates in position. Each collar is fixed to the square shaft 16 by a hand screw 20. A plurality of skewers 21 are adapted to be used with the apparatus.

As shown in FIG. 3, support plate 17 includes a plurality of circumferentially spaced circular openings 22 through which the ends of the skewers 21 are adapted to extend. As shown, the diameter of the openings 22 is greater than the diameter of the skewers 21. The other plate 18 is formed with an equal number of circumferentially spaced circular openings 23 of greater diameter than the openings 22. The inner periphery or edge of each opening 23 is formed with teeth 24. A gear 25 fixed to each skewer 21 is adapted to engage the teeth 24 of each opening. As shown in FIG. 5, each gear 25 comprises a pinion 26 mounted on a bushing 27 which is staked on skewer 21 as at 28. Washers 29, 30 are fixed on bushing 27 and extend beyond the teeth of the pinion 26 adjacent the teeth 24 of opening 23 to maintain the gear 25 in engagement with the teeth 24.

The number of teeth 24 on the edge of each opening 23 differs from the number of teeth 31 on each gear 25 and is preferably greater in number so that when the shaft 16 is rotated, the plates 17, 18 cause the skewer 21 to revolve about the axis of the shaft 16. At the same time, gravity urges each skewer downwardly causing the gears 25 to track along the teeth 24 rotating the skewers 21 about their axes. In this manner, a simultaneous rotation and revolution of the skewers 21 is obtained. Since the number of teeth 31 on the gears 25 differs from the number of teeth on the periphery of each opening 23, different portions or surfaces of the food on the skewers 21 are brought into position adjacent the fire of the outdoor grill which conventionally is below the skewers 21. In order to facilitate mounting and removal of the skewers, radial slots 40 extend from the openings 23 to the edges of plate 18. The width of slots 40 is greater than the diameter of skewers 21.

Since the apparatus involves merely the use of a shaft 16, plates 17, 18 and their associated collars 19, and skewers 21 with their associated gears 25, the apparatus involves a minimum number of parts which can be manufactured readily at low cost. In addition, by the use of the collars 19 the apparatus can be readily disassembled and assembled and packaged in compact form.

In the form of the invention shown in FIG. 6, the plates 35 replace plates 17, 18. Each plate 35 comprises a plurality of circumferentially spaced openings 36 into which the ends of the skewers extend and a plurality of toothed openings 37 positioned alternatively with respect to openings 36 into which the gears of the skewers 21 extend. By utilizing plates 35, the skewers can be positioned alternately, that is, the free end of one skewer extending into one plate while the free end of the adjacent skewer extends into the other plate. This facilitates the positioning and removal of the skewers and, in addition distributes the weight of the apparatus more uniformly throughout the shaft.

The apparatus is utilized by loading the food on the skewers 21 and inserting the loaded skewers into position on the plates by first inserting the free end of each skewer through one of the openings 22 or 36 and thereafter engaging the gear 25 on each skewer with the toothed opening 23 or 37, as the case may be. The other end of each skewer 21 passes through a radial slot 40 to facilitate the engagement of the gear with the toothed opening 23 or 37. As each gear 26 is moved radially into engagement with the teeth of openings 23 or 37, the washers 29, 30 are moved alongside the teeth, as shown in FIG. 5. The loaded skewers may be placed in position on the plates before or after the shaft 16 which holds the plates in mounted position in place of the conventional spit on the outdoor grill, rotisserie of a gas or electric range or portable rotisserie unit. After a cooking operation, the skewers 21 may be individually removed or the shaft 16 carrying the plates and the skewers may be removed as a unit and then the skewers unloaded from their positions on the plates.

It can thus be seen that I have provided a skewer cooking apparatus which will effectively bring successive portions of the food adjacent the fire, which can be manufactured at low cost, which utilizes a minimum number of parts, which can be readily assembled and disassembled, and which can be used with conventional outdoor grills presently in use.

I claim:

1. In skewer cooking apparatus, the combination comprising a shaft which is adapted to be rotated about its axis, a pair of radially extending supports fixed at longitudinally spaced points on said shaft, a plurality of skewers, a plurality of first circular openings at circumferentially spaced points on one of said supports about said shaft, said first openings receiving one end of said skewers, a plurality of second circular openings on the other of said supports generally axially aligned opposite said first openings, each said second opening having a greater diameter than the opposite first opening, said other support being formed with gear teeth substantially uniformly spaced about the inner periphery of each said second opening, a circular gear on each said skewer formed with substantially uniformly spaced gear teeth complementary to and engaging the gear teeth of one said second opening, the diameter of each said second opening being substantially greater than the diameter of its corresponding gear, the number of teeth on each said gear being less than the number of teeth on te periphery of its respective second opening so that when said shaft is rotated, said skewers are caused to simultaneously revolve about the axis of said shaft and rotate substantially uniformly about their respective axes due to the continual action of the movement of said supports and gravity on said skewers which causes each said gear to track about the gear teeth on the periphery of its respective second opening in a controlled manner such that different surfaces of the food on the skewers are brought into position adjacent the fire upon each successive revolution of the skewers about the axis of said shaft.

2. The combination set forth in claim 1 including means on said skewers engaging a support for preventing substantial axial movement of said gears relative to second opening thereby maintaining said gears in engagement with the teeth of said second openings.

3. The combination set forth in claim 1 including radially extending portions on each gear extending beyond the base of said gear teeth of each gear on each side of said gear teeth for maintaining said gear in engagement with said gear teeth of its respective second opening.

4. In skewer cooking apparatus, the combination comprising a shaft which is adapted to be rotated about its axis, a pair of radially extending supports fixed at longitudinally spaced points on said shaft, a plurality of skewers, a plurality of first circular openings at circumferentially spaced points on each of said supports about said shaft, said first openings receiving one end of said skewers, a plurality of second circular openings on each of said supports generally axially aligned opposite said first openings, each said second opening having a greater diameter than the opposite first opening, each said support being formed with gear teeth substantially uniformly spaced about the inner periphery of each said second opening, a circular gear on each said skewer formed with substantially uniformly spaced gear teeth complimentary to and engaging the gear teeth of one said second opening, the diameter of each said second opening being substantially greater than the diameter of its corresponding gear, the number of teeth on each said gear being less than the number of teeth on the periphery of its respective second opening so that when said shaft is rotated, said skewers are caused to simultaneously revolve about the axis of said shaft and rotate substantially uniformly about their respective axes due to the continual action of the movement of said supports and gravity on said skewers which causes each said gear to track about the gear teeth on the periphery of its respective second opening in a controlled manner such that different surfaces of the food on the skewers are brought into position adjacent the fire upon each successive revolution of the skewers about the axis of said shaft.

References Cited by the Examiner

UNITED STATES PATENTS

| | | | |
|---|---|---|---|
| 1,634,142 | 6/27 | Hammond | 99—420 X |
| 1,723,145 | 8/29 | Fernald | 99—421 |
| 2,482,601 | 9/49 | Spartalis | 99—421 |
| 2,762,293 | 9/56 | Boyajian | 99—421 |
| 2,985,096 | 5/61 | Wolske | 99—421 |
| 3,125,015 | 3/64 | Schlaegel | 99—421 |

ROBERT E. PULFREY, *Primary Examiner.*

GEORGE A. NINAS, Jr., JOSEPH D. BEIN, JEROME SCHNALL, *Examiners.*